(12) United States Patent
Zhou

(10) Patent No.: US 10,423,814 B2
(45) Date of Patent: *Sep. 24, 2019

(54) METHOD FOR UNLOCKING MOBILE TERMINAL AND MOBILE TERMINAL

(71) Applicant: GUANGDONG OPPO MOBILE TELECOMMUNICATIONS CORP., LTD., Dongguan (CN)

(72) Inventor: Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 303 days.

This patent is subject to a terminal disclaimer.

(21) Appl. No.: 15/605,365

(22) Filed: May 25, 2017

(65) Prior Publication Data

US 2017/0344803 A1 Nov. 30, 2017

(30) Foreign Application Priority Data

May 30, 2016 (CN) .......................... 2016 1 0375552

(51) Int. Cl.
*G06K 9/28* (2006.01)
*G06K 9/00* (2006.01)
*G06F 21/32* (2013.01)

(52) U.S. Cl.
CPC ......... *G06K 9/00087* (2013.01); *G06F 21/32* (2013.01); *G06K 9/001* (2013.01);
(Continued)

(58) Field of Classification Search
CPC .......................... G06K 9/00087–9/001; G06K 9/00006–9/0012; G06F 21/32
See application file for complete search history.

(56) References Cited

U.S. PATENT DOCUMENTS

2002/0048390 A1 4/2002 Ikegami
2005/0238214 A1 10/2005 Matsuda et al.
(Continued)

FOREIGN PATENT DOCUMENTS

| CN | 105095722 A | 11/2015 |
|----|-------------|---------|
| CN | 105335731 A | 2/2016 |

(Continued)

OTHER PUBLICATIONS

Extended European search report issued in corresponding European application No. 17170390.3 dated Oct. 12, 2017, 8 pages.
(Continued)

*Primary Examiner* — Brian Werner

(74) *Attorney, Agent, or Firm* — Young Basile Hanlon & MacFarlane, P.C.

(57) ABSTRACT

A method for unlocking a mobile terminal may include the follows. A set of feature points are acquired. The set of the feature points are acquired via a scanning partition of a fingerprint recognition sensor. The fingerprint recognition sensor includes M scanning partitions, the number of sensing electrodes within each of the M scanning partitions is greater than a first preset threshold, and M is a positive integer greater than 1. The mobile terminal is unlocked when the set of the feature points are successfully matched with a template stored in advance in the mobile terminal.

18 Claims, 7 Drawing Sheets

(52) U.S. Cl.
CPC ......... *G06K 9/0002* (2013.01); *G06K 9/0008* (2013.01); *G06K 9/00013* (2013.01); *G06K 9/00067* (2013.01)

(56) References Cited

U.S. PATENT DOCUMENTS

| | | |
|---|---|---|
| 2013/0169780 A1 | 7/2013 | Wu |
| 2015/0324570 A1 | 11/2015 | Lee et al. |
| 2016/0034741 A1* | 2/2016 | Lan .......................... G06K 9/00 382/124 |
| 2016/0063230 A1 | 3/2016 | Alten |

FOREIGN PATENT DOCUMENTS

| | | | |
|---|---|---|---|
| CN | 105389565 A | 3/2016 | |
| CN | 105608409 A | 5/2016 | |
| CN | 106022069 A | 10/2016 | |
| EP | 1452944 A2 * | 9/2004 | ............. G06F 21/32 |

OTHER PUBLICATIONS

International Search Report issued in corresponding International Application No. PCT/CN2017/083871 dated Aug. 22, 2017 (12 pp).

\* cited by examiner

METHOD FOR UNLOCKING MOBILE TERMINAL AND MOBILE TERMINAL

CROSS REFERENCE TO RELATED APPLICATION

This application claims priority to Chinese Patent Application No. 201610375552.X, filed on May 30, 2016, the content of which is hereby incorporated by reference in its entirety.

TECHNICAL FIELD

The present disclosure relates to the technical field of mobile terminals, and particularly to a method for unlocking a mobile terminal and a mobile terminal.

BACKGROUND

Fingerprints refer to prints formed by uneven skins on human finger pulps at ends of human fingers. Human fingerprints are subjected to genetic and environmental interaction, and also closely related to the human health, so everyone has fingerprints, but the fingerprints are different. Because the repetitive rates of the fingerprints are very low, which is about one in 15 billion, the fingerprints are so called "human identity cards." Based on such feature, the fingerprints are widely used as identity authentication information.

For example, a fingerprint identification technology has become a standard configuration for flagship models of mainstream mobile terminal manufacturers. A fingerprint identification process includes feature extracting, data saving, and image matching. After an original image of the human fingerprint is read through a fingerprint identification sensor, the image is matched with a pre-saved registered fingerprint template firstly, and then the mobile terminal is unlocked after the matching is successful.

The unlocking speed directly affects the efficiency of the user for using a device. The unlocking speed has become a major product competition highlight of various manufactures. Therefore, how to reduce the unlocking time to improve the unlocking efficiency is an important research field.

BRIEF DESCRIPTION OF THE DRAWINGS

To better illustrate the technical solution of embodiments of the present disclosure or the technical solution of the present technology, the following descriptions will briefly illustrate the accompanying drawings described in the embodiments or the present technology. Obviously, the following described accompanying drawings are some embodiments of the present disclosure. Those skilled in the art can obtain other accompanying drawings according to the described accompanying drawings without creative efforts.

DETAILED DESCRIPTION

In order to make a better understanding of technical solutions of the present disclosure by those skilled in the art, the technical solutions of embodiments of the present disclosure will be described clearly and completely in combination with the accompanying drawings of the embodiments of the present disclosure. Obviously, the described embodiments are merely a part of embodiments of the present disclosure, and not all of the embodiments. All other embodiments obtained by those skilled in the art without creative efforts based on the embodiments of the present disclosure shall fall within the protection scope of the present disclosure.

Terms "first", "second", "third", "fourth", and so on used in the specification, appended claims, and accompanying drawings of the present disclosure are used to distinguish different objects rather than describe specific sequences. Additionally, terms "include", "have", and any deformation thereof are intended to cover non-exclusive inclusion relationship. For example, a process, method, system, product, or device including a series of steps or units is not limited to listed steps or units, and In at least one alternative embodiment, can include steps or units which are not listed, or In at least one alternative embodiment, can further include other inherent steps or units for the process, method, product, or device.

The "embodiments" mentioned herein means that particular features, structures or characteristics described with reference to the embodiments may be included in at least one embodiment of the disclosure. Phrases appearing at various positions of the specification neither always refer to the same embodiment, nor separate or alternative embodiments that are mutually exclusive with other embodiments. It is explicitly and implicitly understood by those skilled in the art that the embodiments described herein may be combined with other embodiments.

Figure 8:
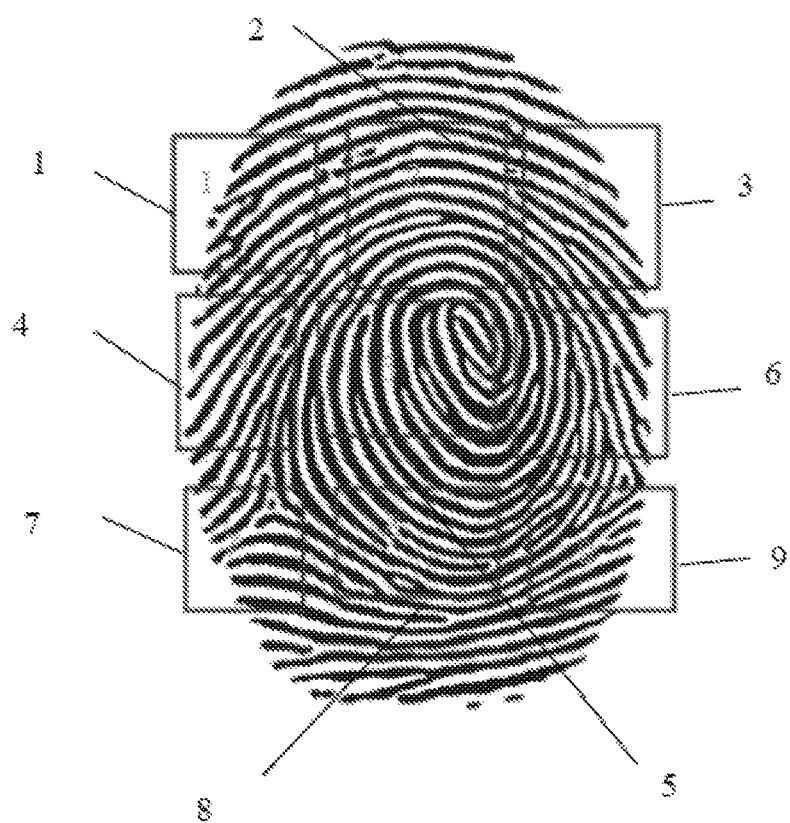
FIG. 8 is a schematic diagram illustrating an example of a template.

In the present disclosure, the term "template" means that, when a fingerprint function of a terminal such as a mobile phone is enabled for the first time, the user may be asked to undergo a fingerprint registration process. During the fingerprint registration, the user puts his or her finger on a fingerprint sensor for fingerprint image reception, and the fingerprint image received will be stored as a template, usually, one finger corresponds to one template. Generally, the fingerprint sensor may receive 10-20 times for each finger in order to receive the whole fingerprint face and generate a comprehensive template. Characteristic information can be obtained from the fingerprint image received, and for example, the template can be saved in the form of image. FIG. 8 illustrates an exemplary template, and the numbers marked in the fingerprint of FIG. 8 refers to feature points.

In the following, when we refer to "receive" or "receiving" fingerprint image or fingerprint data, it means that a mobile terminal or a fingerprint recognition sensor of the mobile terminal or other related components of the mobile terminal can acquire, collect, obtain or in other manners to get the fingerprint image or fingerprint data. The present disclosure is not limited thereto.

The present disclosure relates to a method for unlocking a mobile terminal. The method may include the follows. A set of feature points from a finger of a user are acquired. The set of the feature points are acquired via a scanning partition of a fingerprint recognition sensor. The fingerprint recognition sensor includes M scanning partitions, the number of sensing electrodes within each of the M scanning partitions is greater than a first preset threshold, and M is a positive integer greater than 1. The mobile terminal is unlocked when the set of feature points are successfully matched with a template stored in advance in the mobile terminal.

The present disclosure further relates to a mobile terminal to execute the method for unlocking the mobile terminal.

In order to better understand the method for unlocking the mobile terminal and the mobile terminal disclosed in the embodiments of the disclosure, the embodiments of the disclosure will be described in detail hereinafter.

Figure 1:
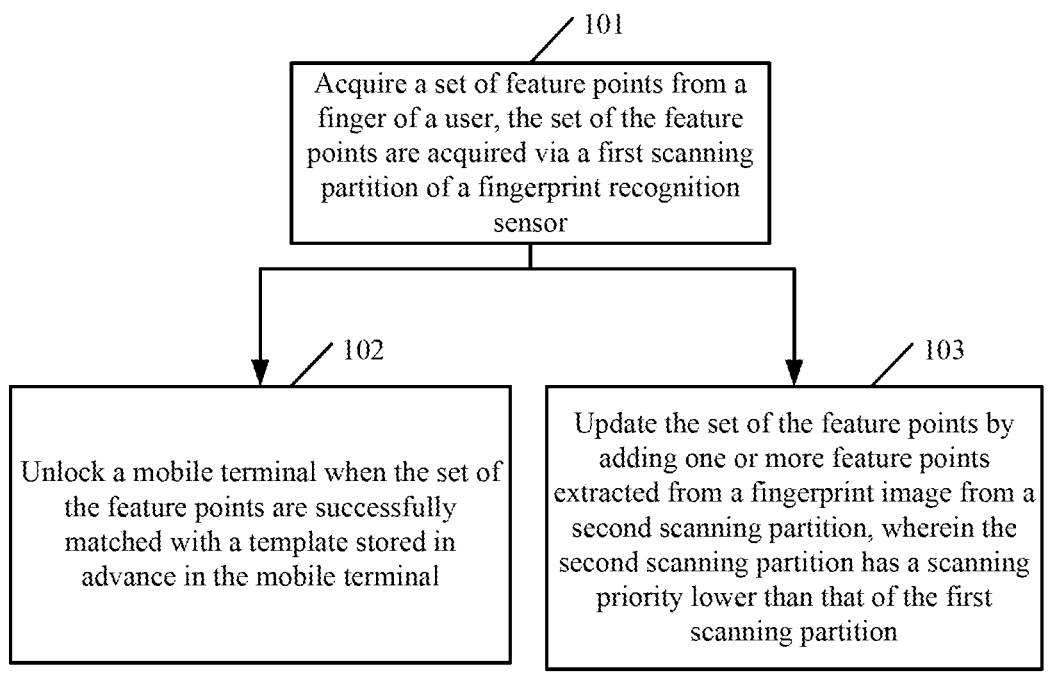
FIG. 1 is a flow chart of a method for unlocking a terminal in accordance with an embodiment of the present disclosure.

FIG. 1 is a method for unlocking a mobile terminal in accordance with an embodiment of the present disclosure. As illustrated by FIG. 1, the method may begin at block 101.

At block 101, a mobile terminal acquires a set of feature points from a finger of a user. The set of feature points are acquired via a first scanning partition of a fingerprint recognition sensor. The fingerprint recognition sensor may include M scanning partitions. The number of sensing electrodes within each of the M scanning partitions is greater than a first preset threshold, and M is a positive integer greater than 1.

The mobile terminal is in a black-screen status or a bright-screen and screen-locking status. The fingerprint recognition sensor of the mobile terminal includes a sensing electrode array of multi-rows multi-columns, for example, a sensing electrode array of 192-rows 56-columns. Correspondingly, each of the M scanning partitions includes its sensing electrodes.

Generally, when fingerprint unlocking is performed on the mobile terminal, and a fingerprint image which generally includes at least twenty feature points is generated according to the fingerprint data collected by the fingerprint identification sensor, when twenty feature points are matched by the mobile terminal, the user identity may be determined to perform the unlocking operation. That is to say, at least twenty sets of fingerprint data can be acquired by each of the M scanning partitions, that is, the number of the sensing electrodes in each of the M scanning partitions is greater than nineteen, correspondingly, at least twenty feature points can be extracted from the fingerprint image acquired by scanning and processing operation of the corresponding scanning partition. Thus, each of the scanning partition at least includes twenty sensing electrodes, that is, the first preset threshold may be nineteen, twenty, twenty-one, twenty-two, or other.

Generally, a distinguishing degree of scanning the finger via the sensing electrodes in an intermediate region is higher than that of scanning the finger via sensing electrodes in an edge region of the sensing electrode array. Therefore, the sensing electrodes in each of the M scanning partitions do not include edge sensing electrodes of the sensing electrode array of the fingerprint recognition sensor. The edge sensing electrodes include previous X1-rows sensing electrodes of the sensing electrode array and latter X2-rows sensing electrodes of the sensing electrode array, and X1 and X2 are positive integers. Thus, the invalid time of scanning the finger via the previous X1-rows sensing electrodes and the latter X2-rows sensing electrodes can be reduced, accordingly, the unlocking speed of the mobile terminal is improved.

It can be understood that various manners can be used to acquire the M scanning partitions, and the embodiment of the present disclosure is not limited to the above described manner.

In an embodiment, the mobile terminal can provide a partition setting interface for allowing a user to perform partition setting. For example, for the sensing electrode array of 192-rows 56-columns, the sensing electrode array can be divided into a number of equal scanning partitions according to the number of rows. When the user sets the number of sensing electrodes in each scanning partition, the number of the scanning partitions can be accordingly determined.

In another embodiment, fingerprint unlocking is related to user habit, thus according to multiple successful fingerprint unlocking, the mobile terminal can determine the average number of feature points collected by the fingerprint recognition sensor each time fingerprint unlocking succeeds, and determines the number of the scanning partitions according to the average number and the first preset threshold. For example, when the average number of the feature points collected by the fingerprint recognition sensor each time the fingerprint unlocking succeeds is one hundred, the mobile terminal can divide the sensing electrode array into five equal scanning partitions according to the number of rows.

For example, a manner in which the set of the feature points are acquired may include the follows.

The mobile terminal scans a finger via the first scanning partition to acquire fingerprint data having a first priority, generates a fingerprint image having the first priority according to the fingerprint data having the first priority, and extracts feature points of the fingerprint image having the first priority to acquire the set of feature points.

As the fingerprint of the finger includes rugged finger valleys and finger peaks, the mobile terminal can calculate specific distribution of the finger valleys and the finger peaks based on capacitance values formed between the finger valleys and the sensing electrodes (such as capacitive sensors) and capacitance values formed between the finger peaks and the sensing electrodes (such as capacitive sensors).

A working principle is as follows: each sensing electrode of the fingerprint identification sensor is pre-charged to a reference voltage. When the finger contacts with the sensing electrode, as the peak is convex and the valley is concave, a distance between the finger peak and a plane of the sensing electrode is different from that between the finger valley and the plane of the sensing electrode. According to a relationship between capacitance values and distances, different capacitance values may be formed at the positions of the finger peaks and the finger valleys, and then a discharge current is used to discharge. Because the capacitance values corresponding to the finger peaks and the finger valleys are different, the corresponding discharge speeds are also different. The finger peak is close to the sensing electrode, the capacitance is high, and the discharge speed is slower. The finger valley is far from the sensing electrode, the capacitance is low, and the discharge speed is faster. According to different discharge speeds, the positions of the finger peaks and the finger valleys can be determined, so that fingerprint image data corresponding to the finger is generated.

At block 102, when the set of the feature points are successfully matched with a template stored in advance in the mobile terminal, the mobile terminal is unlocked.

In at least one alternative embodiment, the mobile terminal calculates a matching degree between each feature point in the set of the feature points and the template, and when the number of the feature points in the set of the feature points with a matching degree greater than a preset matching degree is greater than a second preset threshold, the mobile terminal determines that the set of the feature points match with the template.

When the number of the feature points in the set of the feature points is the same as that of the feature points in the template, the matching degree is one, the preset matching degree may be 0.97, 0.98, 0.99, or other, the second preset threshold can be twenty, twenty-one, twenty-two, or other.

For example, a manner in which the mobile terminal is unlocked is as follows: loading a system application desktop of the mobile terminal; or loading an application interface of an application interrupted in the previous black-screen operation of the mobile terminal.

In the embodiment, as the number of the sensing electrodes within the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced.

In at least one alternative embodiment, the method may further include an operation at block 103. At block 103, the set of the feature points are updated by adding one or more feature points extracted from a fingerprint image from a second scanning partition. The second scanning partition has a scanning priority lower than that of the first scanning partition.

In at least one alternative embodiment, when the set of the feature points are not successfully matched with the template, and it is detected that the first scanning partition is not the scanning partition having the lowest scanning priority, the set of the feature points are updated.

For example, a manner in which the set of the feature points are updated may include the follows.

The mobile terminal scans the finger via the second scanning partition to acquire fingerprint data having a second priority, generates a fingerprint image having the second priority according to the fingerprint data having the second priority, extracts feature points of the fingerprint image having the second priority, and adds the feature points into the set of feature points. The second priority is lower than the first priority.

In an embodiment, a manner in which the mobile terminal scans the finger via the second scanning partition to acquire the fingerprint data having the second priority may include the follows.

The mobile terminal acquires n2 underlying signals corresponding to n2 normal sensing electrodes within the second scanning partition. The second scanning partition includes n1 abnormal sensing electrodes and the n2 normal sensing electrodes, and n1 and n2 are positive integers. The n1 reference underlying signals corresponding to n1 abnormal sensing electrodes are determined according to the n2 underlying signals collected by the n2 normal sensing electrodes. The n1 reference underlying signals and the n2 underlying signals are configured to form fingerprint data.

Furthermore, a manner in which the mobile terminal determines the n1 reference underlying signals corresponding to the n1 abnormal sensing electrodes according to the n2 underlying signals collected by the n2 normal sensing electrodes may include the follows.

The mobile terminal calculates an average value of the n2 underlying signals, and determines the average value to be each of the n1 reference underlying signals corresponding to the n1 abnormal sensing electrodes.

It is thus clear that the abnormal underlying signals collected by the abnormal sensing electrodes can be modified by the mobile terminal, which is beneficial for improving the accuracy of the fingerprint data, and thus improving the unlocking security.

Further, another manner in which the mobile terminal determines the n1 reference underlying signals corresponding to the n1 abnormal sensing electrodes according to the n2 underlying signals collected by the n2 normal sensing electrodes may include the follows.

The mobile terminal acquires a coordinate value of each of the n1 abnormal sensing electrodes, and performs a mean processing on each abnormal sensing electrode according to the coordinate value of each abnormal sensing electrode and the n2 underlying signals, so as to acquire the n1 reference underlying signals corresponding to the n1 abnormal sensing electrodes.

The mean processing includes the follows. x sensing electrodes of the n2 normal sensing electrodes are determined, and a distance between each of the x sensing electrodes and the coordinate value of each of the abnormal sensing electrodes subjected to the mean processing is smaller than a preset distance. The average value of x underlying signals corresponding to the x sensing electrodes is calculated, and the average value is determined to be the reference underlying signals value of each abnormal sensing electrode subjected to the mean processing, and x is a positive integer.

It is thus clear that the abnormal underlying signals collected by the abnormal sensing electrodes can be modified by the mobile terminal, which is beneficial for improving the accuracy of the fingerprint data, and thus improving the unlocking security.

It can be seen that for the method provided in the embodiment, the fingerprint recognition sensor is divided into multiple scanning regions, in a descending order of scanning priorities of the scanning regions, feature points are acquired by scanning and processing the finger via the scanning partition so as to update the set of the feature points. The set of the feature points are matched with the template. When the set of the feature points match with the template, the mobile terminal is unlocked. As the number of the sensing electrodes within the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced. Furthermore, under the condition of that the scanning partition having a higher scanning priority is used, the time of matching the set of the feature points with the template is shorter, thus the unlocking speed of the mobile terminal is improved.

In at least one alternative embodiment, the set of the feature points may further include one or more feature points extracted from a fingerprint image from a third scanning partition, and the third scanning partition has a scanning priority greater than that of the first scanning partition.

In at least one alternative embodiment, the following operations are executed before acquiring the set of the feature points. The mobile terminal receives N fingerprint images each of which can successfully unlock the mobile terminal. Each of the N fingerprint images includes M partial fingerprint images corresponding to the M scanning partitions, N is a positive integer, and each of the N fingerprint images has one or more feature points. The mobile terminal determines, according to the N fingerprint images, the average number of feature points of the M partial fingerprint images corresponding to each of the M scanning partitions, and determines scanning priorities of the M scanning partitions according to the average number of the M partial fingerprint images corresponding to each of the M scanning partitions.

For example, it is assumed that the fingerprint recognition sensor of the mobile terminal includes five scanning partitions, which are the first, the second, the third, the fourth, and the fifth scanning partitions, and the fingerprint images corresponding to one hundred successful unlocking are acquired, the average number of the feature points of the partial fingerprint images corresponding to the first scanning partition is twenty-two, the average number of the feature points of the partial fingerprint images corresponding to the second scanning partition is thirty-one, the average number of the feature points of the partial fingerprint images corresponding to the third scanning partition is eighty-four, the average number of the feature points of the partial fingerprint images corresponding to the fourth scanning partition is thirty-four, and the average number of the feature points of the partial fingerprint images corresponding to the fifth scanning partition is twenty-five. According to the average number of the feature points of the partial fingerprint images corresponding to each of the five scanning partitions, the mobile terminal determines that a descending priority order of the five scanning partitions is the third scanning partition, the fourth scanning partition, the second scanning partition, the fifth scanning partition, and the first scanning partition. That is, the scanning priority of the third scanning partition is highest, and the scanning priority of the first scanning partition is the lowest.

Figure 2:
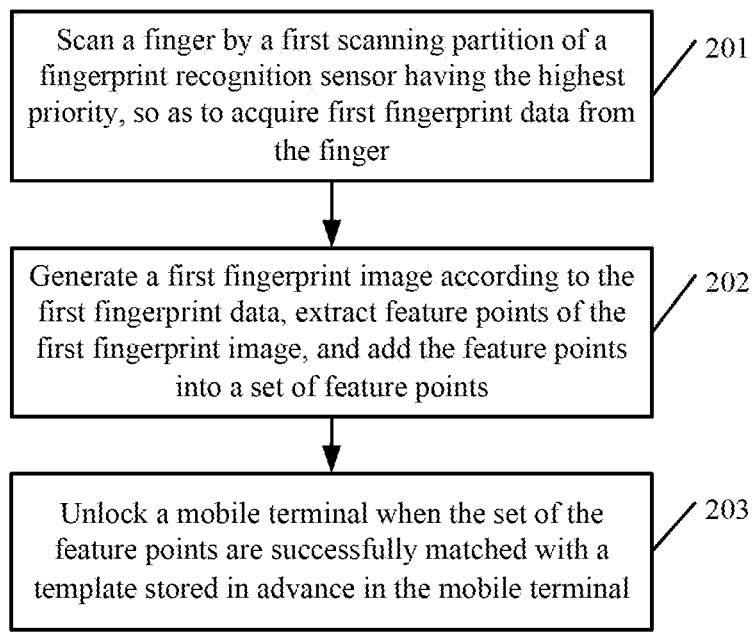
FIG. 2 is a flow chart of another method for unlocking a terminal in accordance with an embodiment of the present disclosure.

Consistent with the embodiment as illustrated by FIG. 1, FIG. 2 is a flow chart of another method for unlocking a mobile terminal provided by an embodiment of the present disclosure. As illustrated in the FIG. 2, the method may begin at block 201.

At block 201, when a mobile terminal detects a touch operation on a fingerprint identification sensor of the mobile terminal, a finger is scanned by a first scanning partition of the fingerprint recognition sensor having the highest priority, so as to acquire first fingerprint data from the finger.

The number of sensing electrodes within the first scanning partition is greater than a first preset threshold. For example, the first preset threshold may be nineteen or any other number between 19 and 100.

At block 202, the mobile terminal generates a first fingerprint image according to the first fingerprint data, extracts feature points of the first fingerprint image, and adds the feature points into a set of feature points.

At block 203, when the set of the feature points are successfully matched with a template stored in advance in the mobile terminal, the mobile terminal is unlocked.

It can be seen that for the method provided in the embodiment, the fingerprint recognition sensor is divided into multiple scanning regions, in a descending order of scanning priorities of the scanning regions, feature points are acquired by scanning and processing the finger via the scanning partition so as to update the set of the feature points. The set of the feature points are matched with the template. When the set of the feature points match with the template, the mobile terminal is unlocked. As the number of the sensing electrodes within the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced. Furthermore, under the condition of that the scanning partition having a higher scanning priority is used, the time of matching the set of the feature points with the template is shorter, thus the unlocking speed of the mobile terminal is improved.

Figure 3:
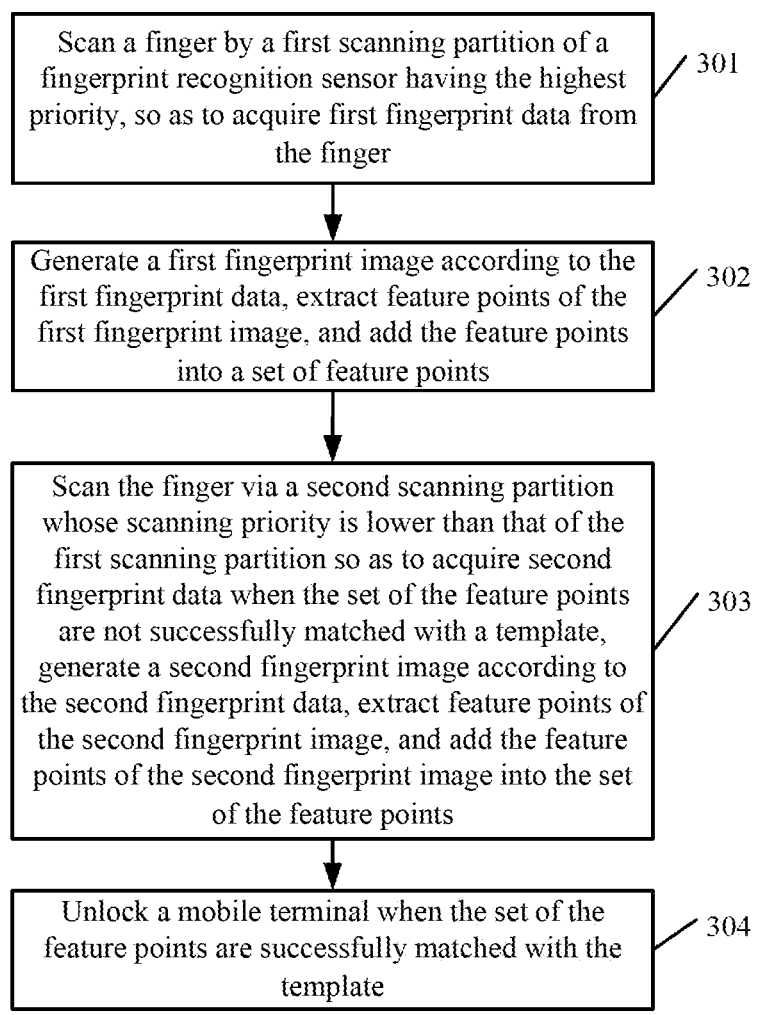
FIG. 3 is a flow chart of another method for unlocking a terminal in accordance with an embodiment of the present disclosure.

Consistent with the embodiments as illustrated by FIG. 1 and FIG. 2, FIG. 3 is a flow chart of another method for unlocking a mobile terminal provided by an embodiment of the present disclosure. As illustrated in the FIG. 3, the method may begin at block 301.

At block 301, when a mobile terminal detects a touch operation on a fingerprint identification sensor of the mobile terminal, a finger is scanned by a first scanning partition of the fingerprint recognition sensor having the highest priority, so as to acquire first fingerprint data from the finger.

The number of sensing electrodes within the first scanning partition is greater than a first preset threshold. For example, the first preset threshold can be nineteen At block 302, the mobile terminal generates a first fingerprint image according to the first fingerprint data, extracts feature points of the first fingerprint image, and adds the feature points into a set of feature points.

At block 303, when the set of the feature points are not successfully matched with a template stored in advance in the mobile terminal, the mobile terminal scans the finger via a second scanning partition whose scanning priority is lower than that of the first scanning partition so as to acquire second fingerprint data, generates a second fingerprint image according to the second fingerprint data, extracts feature points of the second fingerprint image, and adds the feature points of the second fingerprint image into the set of the feature points.

At block 304, when the set of the feature points are successfully matched with the template, the mobile terminal is unlocked.

It can be seen that for the method provided in the embodiment, the fingerprint recognition sensor is divided into multiple scanning regions, in a descending order of scanning priorities of the scanning regions, feature points are acquired by scanning and processing the finger via the scanning partition so as to update the set of the feature points. The set of the feature points are matched with the template. When the set of feature points match with the template, the mobile terminal is unlocked. As the number of the sensing electrodes within the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced. Furthermore, under the condition of that the scanning partition having a higher scanning priority is used, the time of matching the set of the feature points with the template is shorter, thus the unlocking speed of the mobile terminal is improved.

Figure 4:
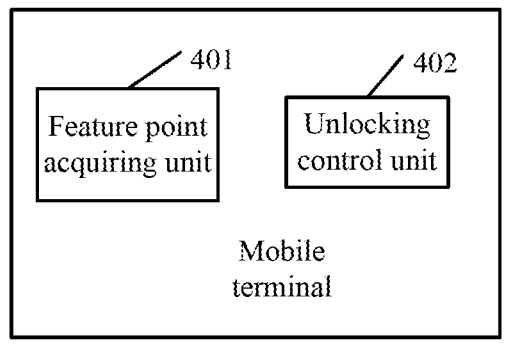
FIG. 4 is a block diagram of a mobile terminal in accordance with an embodiment of the present disclosure.

The following is a device embodiment of the present disclosure. The device embodiment of the present disclosure is used to execute the method realized by the method embodiment of the present disclosure. As illustrated by FIG. 4, a mobile terminal can include a feature point acquiring unit 401 and an unlocking control unit 402.

The feature point acquiring unit 401 is configured to acquire a set of feature points from a finger of a user. The set of the feature points are acquired via a first scanning partition of a fingerprint recognition sensor. The fingerprint recognition sensor may include M scanning partitions. The number of sensing electrodes within each of the M scanning partitions is greater than a first preset threshold, and M is a positive integer greater than 1.

The unlocking control unit 402 is configured to unlock the mobile terminal when the set of the feature points are successfully matched with a template stored in advance in the mobile terminal.

In the embodiment, as the number of the sensing electrodes in the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced.

Figure 5:
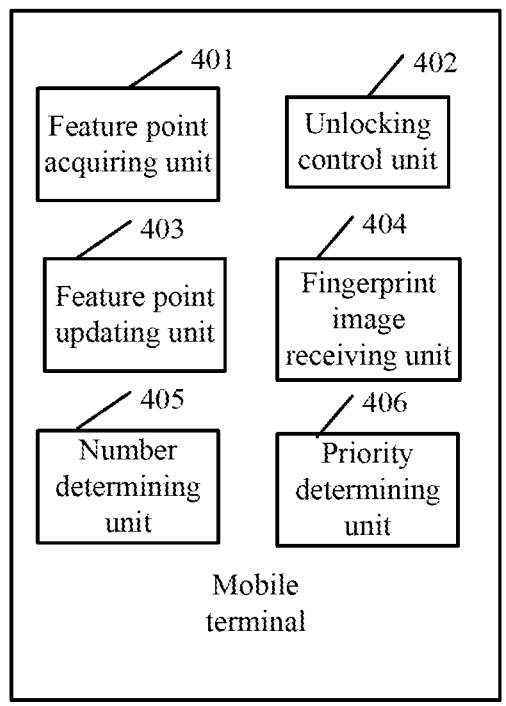
FIG. 5 is a block diagram of another mobile terminal in accordance with an embodiment of the present disclosure.

In at least one alternative embodiment, as illustrated in FIG. 5, besides the feature point acquiring unit 401 and the unlocking control unit 402, the mobile terminal may further include a feature point updating unit 403, a fingerprint image receiving unit 404, a number determining unit 405, and a priority determining unit 406.

The feature point updating unit 403 is configured to update the set of the feature points by adding one or more feature points extracted from a fingerprint image from a second scanning partition, where the second scanning partition has a scanning priority lower than that of the first scanning partition.

In at least one alternative embodiment, when the set of the feature points are not successfully matched with the template and the first scanning partition is not the scanning partition having the lowest scanning priority, the set of the feature points are updated.

The fingerprint image receiving unit 404 is configured to receive N fingerprint images each of which can successfully unlock the mobile terminal. Each of the fingerprint images includes M partial fingerprint images corresponding to the M scanning partitions, N is a positive integer, and each of the N fingerprint images has one or more feature points.

The number determining unit 405 is configured to determine, according to the N fingerprint images, the average number of feature points of the M partial fingerprint images corresponding to each of the M scanning partitions.

The priority determining unit 406 is configured to determine the scanning priorities of the M scanning partitions according to the average number of the M partial fingerprint images corresponding to each of the M scanning partitions.

In at least one alternative embodiment, the feature point acquiring unit 401 may be configured to scan a finger via the first scanning partition to acquire fingerprint data having a first priority, generate a fingerprint image having the first priority according to the fingerprint data having the first priority, and extract feature points of the fingerprint image having the first priority to acquire the set of feature points.

In at least one alternative embodiment, the feature point updating unit 403 may be further configured to scan the finger via the second scanning partition to acquire fingerprint data having a second priority, generate a fingerprint image having the second priority according to the fingerprint data having the second priority, extract feature points of the fingerprint image having the second priority, and add the feature points into the set of the feature points. The second priority is lower than the first priority.

In at least one alternative embodiment, the feature point updating unit 403 may be further configured to acquire n2 underlying signals corresponding to n2 normal sensing electrodes within the second scanning partition, and determine n1 reference underlying signals corresponding to n1 abnormal sensing electrodes according to the n2 underlying signals collected by the n2 normal sensing electrodes. The second scanning partition includes n1 abnormal sensing electrodes and the n2 normal sensing electrodes, and n1 and n2 are positive integers. The n1 reference underlying signals and the n2 underlying signals are configured to form fingerprint data.

In at least one alternative embodiment, the feature point updating unit 403 may be further configured to calculate an average value of the n2 underlying signals, and determine the average value to be each of the n1 reference underlying signals corresponding to the n1 abnormal sensing electrodes.

In at least one alternative embodiment, the feature point may further include one or more feature points extracted from a fingerprint image from a third scanning partition, and the third scanning partition has a scanning priority greater than that of the first scanning partition.

It shall be noted that the mobile terminal described in the device embodiment of the present disclosure is illustrated in the form of functional units. The term "unit" used herein shall be taken in the broadest possible sense. Objects for realizing the function of each unit can be an application specific integrated circuit (ASIC), a single circuit, a processor (shared, specific, or chipset) for executing one or more software or hardware procedures, a memory, a combined logic circuit, and/or other appropriate assembly for realizing the above function.

For example, the function that the feature point updating unit 403 updates the set of the feature points can be realized by the mobile terminal of FIG. 5. The manner is that a processor 101 invokes executable program codes of a memory 102 to update the set of the feature points via a scanning partition having a lower priority.

It can be seen that for the method provided in the embodiment, the fingerprint recognition sensor is divided into multiple scanning regions, in a descending order of scanning priorities of the scanning regions, feature points are acquired by scanning and processing the finger via the scanning partition so as to update the set of the feature points. The set of the feature points are matched with the template. When the set of feature points match with the template, the mobile terminal is unlocked. As the number of the sensing electrodes in the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced. Furthermore, under the condition of that the scanning partition having a higher scanning priority is used, the time of matching the set of the feature points with the template is shorter, thus the unlocking speed of the mobile terminal is improved.

Figure 6:
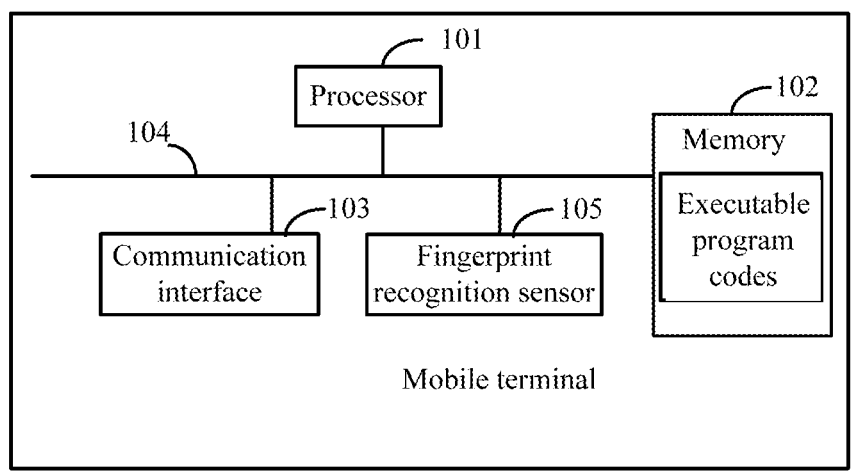
FIG. 6 is a structure diagram of a mobile terminal in accordance with an embodiment of the present disclosure.

An embodiment of the present disclosure further provides another mobile terminal. As illustrated by FIG. 6, the mobile terminal includes the processor 101, the memory 102, a communication interface 103, a communication bus 104, and a fingerprint recognition module 105. The processor 101, the memory 102, the fingerprint recognition module 105, and the communication interface 103 are coupled and communicate with each other via the communication bus 104. The processor 101 controls wireless communication with an external cellular network. The communication bus 103 includes but not limited to an antenna, an amplifier, a transceiver, a coupler, a low noise amplifier (LNA), a duplexer, and so on. The fingerprint recognition module 105 is configured to acquire fingerprint data of a finger. The memory 102 includes at least one of the following: a random access memory, a non-volatile memory, and an external memory. The memory 102 stores executable program codes. The executable program codes can guide the processor 101 to execute the method for controlling unlocking specifically illustrated in the method embodiment of the present disclosure.

The processor 101 is configured to invoke the executable program codes to perform acquiring a set of feature points from a finger of a user, and unlocking the mobile terminal when the set of the feature points are successfully matched with a template stored in advance in the mobile terminal. The set of the feature points are acquired via a first scanning partition of a fingerprint recognition sensor, the fingerprint recognition sensor includes M scanning partitions, the number of sensing electrodes within each of the M scanning partitions is greater than a first preset threshold, and M is a positive integer greater than 1.

In the embodiment, as the number of the sensing electrodes within the scanning region is greater than the first preset threshold, enough feature points can be acquired by scanning and processing the finger via each scanning partition and can be matched with the template. Comparing with the solution of scanning the finger via all regions of the fingerprint recognition sensor, in the embodiment, the size of the scanning partition is reduced, the time of scanning and processing is accordingly reduced.

The executable program codes in the memory 102 can be further configured to execute relate operations illustrated by FIG. 1, FIG. 2, and FIG. 3.

Figure 7:
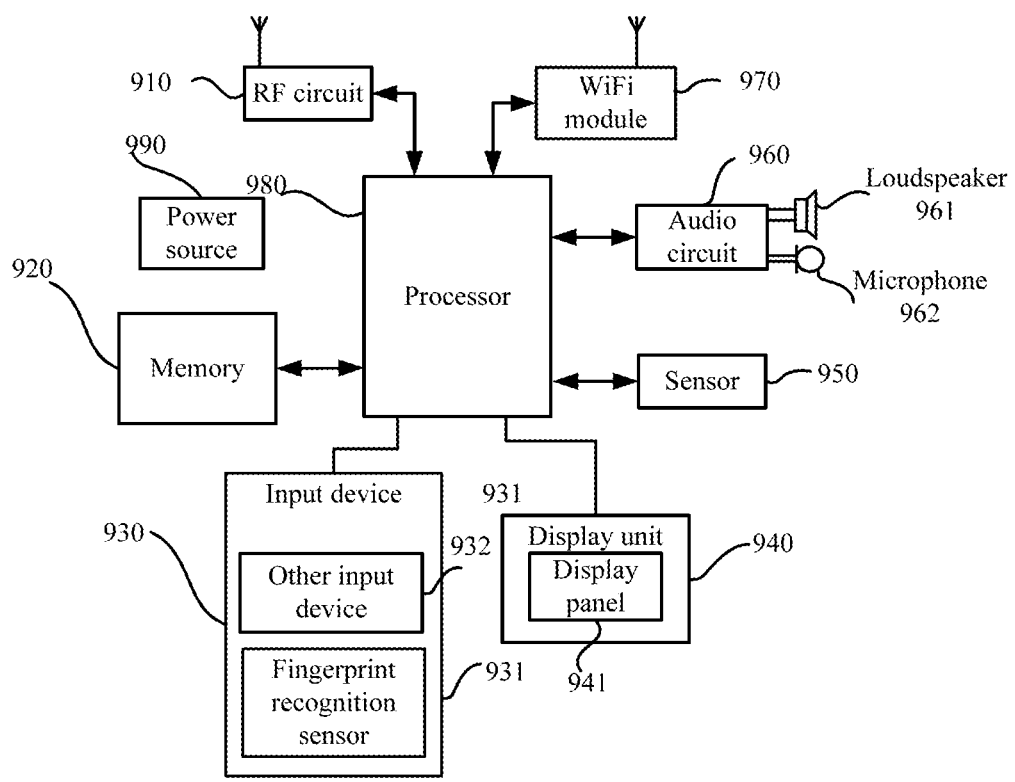
FIG. 7 is a structure diagram of another mobile terminal in accordance with an embodiment of the present disclosure.

An embodiment of the present disclosure further provides another mobile terminal. As illustrated by FIG. 7, for the sake of convenient illustration, only parts related to the embodiment of the present disclosure are illustrated, and the method embodiments of the present disclosure are referred to know technical details. The mobile terminal be a mobile phone, a tablet compute, a personal digital assistant (PDA), a point of sales (POS), an on-board computer, or other. A mobile phone is taken as an example to illustrate the mobile phone.

FIG. 7 is a structure diagram of a mobile phone in accordance with an embodiment of the present disclosure. The mobile phone may include an RF circuit 910, a memory 920, an input unit 930, a display unit 940, at least one sensor 950, an audio circuit 960, a wireless fidelity (WiFi) module 970, a processor 980, a power source 990, and the like.

The RF circuit 910 may be configured to receive and transmit signals in an information receiving and transmitting or communication process, and transmit received downlink information of a base station to the processor 980 for processing. In addition, uplink data is transmitted to the base station. Generally, the RF circuit 910 includes, but is not limited to, an antenna, at least one amplifier, a transceiver, a coupler, a low noise amplifier (LNA), a duplexer, etc. In addition, the RF circuit 910 may further communicate with other devices via wireless communication and a network. The wireless communication may use any one communication standard or protocol, including, but not limited to, a global system of mobile communication (GSM), general packet radio service (GPRS), code division multiple access (CDMA), wideband code division multiple access (WCDMA), long term evolution (LTE), an E-mail, short messaging service (SMS), etc.

The memory 920 may be configured to store software programs and modules, and the processor 980 executes various function applications and data processing of the mobile phone by running the software programs and the modules stored in the memory 920. The memory 920 may mainly include a storage program region and a storage data region. The storage program region may store an operation system, and an application program needed for at least one function (such as a function of obtaining a fingerprint image that succeeds in fingerprint matching, a function of assessing fingerprint image, a function of updating a fingerprint template, and the like). The storage data region may store data (such as history fingerprint image data that succeeds in fingerprint matching, the number of times that all fingerprint templates are successfully matched in a second time period) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone. Specifically, the input unit 930 may include a fingerprint recognition sensor 931 and other input devices 932. The fingerprint recognition sensor 931 can collect fingerprint data. In at least one alternative embodiment, the fingerprint recognition sensor 931 may include an optical fingerprint sensor, a capacitive fingerprint sensor, and a radio fingerprint sensor. The capacitive fingerprint sensor is taken as an example to illustrate the fingerprint recognition sensor. The capacitive fingerprint sensor include sensing electrodes (abnormal sensing electrodes and normal sensing electrodes), and a signal processing circuit (for example, an amplifying circuit, a noise reduction circuit, an analog-digital circuit, and so on). Besides the fingerprint recognition sensor, the input unit 930 may further include the other input devices 932. The other input devices 932 may include, but are not limited to, one or more of a physical keyboard, a functional key (such as a volume control key and a switch key), a track ball, a mouse, and an operating rod.

The display unit 940 may be configured to display information input by the user or information provided for the user or various menus of the mobile phone. The display unit 940 may include a display panel 941, and alternatively, the display panel 941 may be configured in a form of a Liquid Crystal Display (LCD), an Organic Light-Emitting Diode (OLED), etc. Furthermore, the touch panel 931 may cover the display panel 941. When the touch panel 931 detects the touch operation thereon or nearby, the touch operation is transmitted to the processor 980 to determine the type of a touch event, and then the processor 980 provides corresponding visual output on the display panel 941. Although, the touch panel 931 and the display panel 941 implement input of the mobile phone and input functions by serving as two independent parts in FIG. 7, the touch panel 931 and the display panel 941 may be integrated to implement the input of the mobile phone and the input functions in some embodiments.

The at least one sensor 950 may include a light sensor, a motion sensor and other sensors. Specifically, the light sensor may include an ambient light sensor and a proximity sensor, the ambient light sensor may adjust the luminance of a display panel 941 according to the brightness of ambient light, and the proximity sensor may close the display panel 941 and/or backlight when the mobile phone reaches nearby the ear. As one of the motion sensors, an accelerometer sensor may detect the magnitude of an accelerated speed in each direction (generally, three-axis), the size and direction of a gravity may be detected while resting, and the accelerometer sensor may be configured to identify an application of a mobile phone gesture (e.g., horizontal and vertical screen switching, relevant games, and magnetometer gesture calibration), and vibration identification relevant functions (e.g., pedometer and knocking), etc. Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961, and a microphone 962 may provide an audio interface between the user and the mobile phone. The audio circuit 960 may transmit an electric signal converted from the received audio data to the loudspeaker 961, and the loudspeaker 961 converts the electric signal into a sound signal for output. Besides, the microphone 962 converts a collected sound signal into an electric signal, the audio circuit 960 converts the received electric signal into audio data and then outputs the audio data to the processor 980 for processing, the audio data is transmitted to another mobile phone via the RF circuit 910, or the audio data is output to the memory 920 for further processing.

WiFi belongs to a short-range wireless transmission technology, the mobile phone may assist the user in E-mail receiving and sending, webpage browsing, access to streaming media and the like by means of the WiFi module 970, and it provides a wireless wideband internet access for the user. Although FIG. 7 shows the WiFi module 970, it may be understood that the WiFi module 970 does not belong to necessary components of the mobile phone and can totally be omitted without changing the essence of the present disclosure as required.

The processor 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. Alternatively, the processor 980 may include one or more processing units. Preferably, the processor 980 may be integrated with an application processor and a modulation-demodulation processor, the application processor mainly processes an operation system, a user interface, an application program and the like, and the modulation-demodulation processor mainly processes wireless communication. It may be understood that the modulation-demodulation processor may not be integrated into the processor 980.

The power supply 990 (such as a battery) supplies power to each component. Preferably, the power supply may be connected with the processor 980 logically via a power supply management system, so as to implement functions of charging, discharging and power consumption management and the like by means of the power supply management system.

The mobile phone may further include a camera, a Bluetooth module and the like, which are not shown, though, will not be elaborated herein.

In the forgoing embodiments illustrated by FIG. 1, FIG. 2, and FIG. 3, each process may be implemented on the basis of the structure of the mobile phone.

In the foregoing embodiment illustrated by FIG. 4 and FIG. 5, the function of each unit may be implemented on the basis of the structure of the terminal phone.

The embodiments of the present disclosure also provide a computer storage medium. The computer storage medium may store a program, and the program executes some or all of the processes of any method for controlling unlocking in the method embodiments.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the embodiments described in the specification are exemplary embodiments and the actions and modules involved are not necessarily necessary for the present disclosure.

In the foregoing embodiments, descriptions of each embodiment are emphasized respectively, and parts which are not elaborated in a certain embodiment may subject to relevant descriptions of other embodiments.

The apparatus disclosed in embodiments provided herein may be implemented in other ways. For example, the device/apparatus embodiments described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the embodiments.

In addition, the functional units in various embodiments of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or CD, and so on.

The forgoing specifically illustrate the embodiment of the present disclosure. The principles and embodiments of the present disclosure are illustrated by means of examples. The above embodiment illustrations are just used to help to understand the method and core concepts of the present disclosure. For a person skilled in the art, according to the idea of the present disclosure, changes may be made based on the embodiments and application ranges. In conclusion, the present disclosure shall not be limited by the specification.

What is claimed is:

1. A method for unlocking a mobile terminal, comprising:
   receiving N fingerprint images each of which is able to successfully unlock the mobile terminal, each of the N fingerprint images comprising M partial fingerprint images corresponding to M scanning partitions of a fingerprint recognition sensor of the mobile terminal, wherein N is a positive integer, and each of the N fingerprint images has at least one feature point;
   acquiring, according to the N fingerprint images, the average number of feature points of the M partial fingerprint images corresponding to each of the M scanning partitions;
   determining a scanning priority of each of the M scanning partitions according to the average number corresponding to each of the M scanning partitions;
   acquiring a set of feature points, the set of the feature points being acquired via a first scanning partition of the fingerprint recognition sensor, the number of sensing electrodes within each of the M scanning partitions being greater than a first preset threshold, and M being a positive integer greater than 1; and
   unlocking the mobile terminal when the set of the feature points are successfully matched with a template stored in advance in the mobile terminal.

2. The method of claim 1, further comprising:
   updating the set of the feature points by adding feature point(s) extracted from a fingerprint image from a second scanning partition, wherein the second scanning partition has a scanning priority lower than that of the first scanning partition.

3. The method of claim 2, wherein acquiring the set of the feature points comprises:
   scanning a finger via the first scanning partition to acquire fingerprint data having a first priority;
   generating a fingerprint image having the first priority according to the fingerprint data having the first priority; and
   extracting feature points of the fingerprint image having the first priority.

4. The method of claim 3, wherein updating the set of the feature points comprises:
   scanning the finger via the second scanning partition to acquire fingerprint data having a second priority, wherein the second priority is lower than the first priority;
   generating a fingerprint image having the second priority according to the fingerprint data having the second priority; and
   extracting feature points of the fingerprint image having the second priority, and adding the feature points of the fingerprint image having the second priority into the set of the feature points.

5. The method of claim 4, wherein scanning the finger via the second scanning partition to acquire the fingerprint data having the second priority comprises:
   acquiring n2 underlying signals corresponding to n2 normal sensing electrodes within the second scanning partition, the second scanning partition comprising n1 abnormal sensing electrodes and the n2 normal sensing electrodes, and n1 and n2 being positive integers; and
   determining n1 reference underlying signals corresponding to the n1 abnormal sensing electrodes according to the n2 underlying signals collected by the n2 normal sensing electrodes, the n1 reference underlying signals and the n2 underlying signals being configured to form fingerprint data.

6. The method of claim 5, wherein determining the n1 reference underlying signals corresponding to the n1 abnormal sensing electrodes according to the n2 underlying signals collected by the n2 normal sensing electrodes comprises:
   calculating an average value of the n2 underlying signals; and
   determining the average value to be each of the n1 reference underlying signals corresponding to the n1 abnormal sensing electrodes.

7. The method of claim 1, wherein the set of the feature points further comprises at least one feature point extracted from a fingerprint image from a third scanning partition, wherein the third scanning partition has a scanning priority greater than that of the first scanning partition.

8. A mobile terminal, comprising:
   a memory configured to store executable program codes; and
   a processor configured to invoke the executable program codes to perform acts comprising:
   receiving N fingerprint images each of which is able to successfully unlock the mobile terminal, each of the N fingerprint images comprising M partial fingerprint images corresponding to M scanning partitions of a fingerprint recognition sensor of the mobile terminal, wherein N is a positive integer, and each of the N fingerprint images has at least one feature point;
   determining, according to the N fingerprint images, the average number of feature points of the M partial fingerprint images corresponding to each of the M scanning partitions;
   determining a scanning priority of each of the M scanning partitions according to the average number corresponding to each of the M scanning partitions;
   acquiring a set of feature points, the set of the feature points being acquired via a first scanning partition of the fingerprint recognition sensor, the number of sensing electrodes within each of the M scanning partitions being greater than a first preset threshold, and M being a positive integer greater than 1; and unlocking the mobile terminal when the set of the feature points are successfully matched with a template stored in advance in the mobile terminal.

9. The mobile terminal of claim 8, wherein the processor is further configured to invoke the executable program codes to perform:
updating the set of the feature points by adding feature point(s) extracted from a fingerprint image from a second scanning partition, wherein the second scanning partition has a scanning priority lower than that of the first scanning partition.

10. The mobile terminal of claim 9, wherein the processor that is configured to invoke the executable program codes to perform acquiring the set of the feature points is further configured to perform:
scanning a finger via the first scanning partition to acquire fingerprint data having a first priority;
generating a fingerprint image having the first priority according to the fingerprint data having the first priority; and
extracting feature points of the fingerprint image having the first priority.

11. The mobile terminal of claim 10, wherein the processor that is configured to perform updating the set of the feature points is further configured to perform:
scanning the finger via the second scanning partition to acquire fingerprint data having a second priority that is lower than the first priority;
generating a fingerprint image having the second priority according to the fingerprint data having the second priority;
extracting feature points of the fingerprint image having the second priority; and
adding the feature points of the fingerprint image having the second priority into the set of the feature points.

12. The mobile terminal of claim 11, wherein the processor that is configured to scan the finger via the second scanning partition to acquire the fingerprint data having the second priority is further configured to perform:
acquiring n2 underlying signals corresponding to n2 normal sensing electrodes within the second scanning partition, wherein the second scanning partition comprises n1 abnormal sensing electrodes and the n2 normal sensing electrodes, and n1 and n2 are positive integers; and
determining n1 reference underlying signals corresponding to the n1 abnormal sensing electrodes according to the n2 underlying signals collected by the n2 normal sensing electrodes, wherein the n1 reference underlying signals and the n2 underlying signals are configured to form fingerprint data.

13. The mobile terminal of claim 12, wherein the processor that is configured to determine the n1 reference underlying signals corresponding to the n1 abnormal sensing electrodes according to the n2 underlying signals collected by the n2 normal sensing electrodes is further configured to perform:
calculating an average value of the n2 underlying signals; and
determining the average value to be each of the n1 reference underlying signals corresponding to the n1 abnormal sensing electrodes.

14. The mobile terminal of claim 8, wherein the set of the feature points further comprises at least one feature point extracted from a fingerprint image from a third scanning partition, wherein the third scanning partition has a scanning priority greater than that of the first scanning partition.

15. A mobile terminal, comprising:
a memory configured to store executable program codes; and
a processor configured to invoke the executable program codes to perform:
receiving N fingerprint images each of which is able to successfully unlock the mobile terminal, each of the N fingerprint images comprising M partial fingerprint images corresponding to M scanning partitions of a fingerprint recognition sensor of the mobile terminal, wherein N is a positive integer, and each of the N fingerprint images has at least one feature point;
determining, according to the N fingerprint images, the average number of feature points of the M partial fingerprint images corresponding to each of the M scanning partitions;
determining a scanning priority of each of the M scanning partitions according to the average number corresponding to each of the M scanning partitions;
acquiring first fingerprint data via a first scanning partition of the fingerprint recognition sensor, the number of sensing electrodes within each of the M scanning partitions being greater than a first preset threshold, and M being a positive integer greater than 1;
generating a first fingerprint image according to the first fingerprint data, extracting feature points of the first fingerprint image, and adding the feature points into a set of feature points from the finger; and
unlocking the mobile terminal when the set of the feature points are successfully matched with a template stored in advance in the mobile terminal.

16. The mobile terminal of claim 15, wherein the first scanning partition is the scanning partition having the highest scanning priority.

17. The mobile terminal of claim 15, wherein the processor is further configured to invoke the executable program codes to perform:
acquiring second fingerprint data from the finger via a second scanning partition when the set of the feature points are not successfully matched with the template, wherein the scanning partition has a scanning priority lower than that of the first scanning partition; and
generating a second fingerprint image according to the second fingerprint data, extracting feature points of the second fingerprint image, and adding the feature points of the second fingerprint image into the set of the feature points.

18. The mobile terminal of claim 15, wherein the processor that is configured to invoke the executable program codes to perform unlocking the mobile terminal is further configured to perform:
loading a system application desktop of the mobile terminal.

* * * * *